(12) United States Patent
Weininger et al.

(10) Patent No.: US 8,868,592 B1
(45) Date of Patent: Oct. 21, 2014

(54) PROVIDING CUSTOMIZED AUTOCOMPLETE DATA

(75) Inventors: Nicholas B. Weininger, San Francisco, CA (US); Radu C. Cornea, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 337 days.

(21) Appl. No.: 13/474,986

(22) Filed: May 18, 2012

(51) Int. Cl.
*G06F 17/30* (2006.01)

(52) U.S. Cl.
CPC ...... *G06F 17/30867* (2013.01); *G06F 17/3064* (2013.01)
USPC .......................................... 707/767

(58) Field of Classification Search
CPC ............... G06F 17/30699; G06F 17/30867; G06F 17/30029; G06F 17/30035; G06F 17/3064; G06F 17/276
USPC ......................................... 707/767, 732–734
See application file for complete search history.

(56) References Cited

U.S. PATENT DOCUMENTS

| 6,182,068 | B1* | 1/2001 | Culliss ......................... 707/721 |
| 7,072,888 | B1 | 7/2006 | Perkins |
| 7,634,463 | B1 | 12/2009 | Katragadda et al. |
| 7,685,144 | B1 | 3/2010 | Katragadda |
| 7,788,248 | B2 | 8/2010 | Forstall et al. |
| 7,890,961 | B2 | 2/2011 | Whittle et al. |
| 5,724,567 | C1 | 6/2011 | Rose et al. |
| 8,645,825 | B1* | 2/2014 | Cornea et al. .................. 715/257 |
| 2003/0041147 | A1 | 2/2003 | van den Oord et al. |
| 2006/0075120 | A1 | 4/2006 | Smit |
| 2006/0242109 | A1 | 10/2006 | Pereira et al. |
| 2007/0061317 | A1 | 3/2007 | Ramer et al. |
| 2010/0005087 | A1* | 1/2010 | Basco et al. ...................... 707/5 |
| 2010/0318538 | A1 | 12/2010 | Wyman et al. |
| 2011/0082848 | A1* | 4/2011 | Goldentouch ................ 707/706 |
| 2011/0106966 | A1 | 5/2011 | Smit |
| 2011/0283236 | A1* | 11/2011 | Beaumier et al. ............. 715/835 |
| 2012/0150979 | A1* | 6/2012 | Monaco ........................ 709/206 |

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on a computer storage medium, for providing customized autocomplete suggestions. First profile data is obtained for a first user. Second profile data is obtained for second users that submitted search queries, where the second users are different from the first user. Based on the first profile data and the second profile data, similarity scores are determined. The similarity scores are each indicative of a degree of similarity between the first user and at least one of the second users. A proper subset of the search queries is selected based on the similarity scores, and an update for an autocomplete cache of a computing device associated with the first user is generated using the selected subset of search queries. The update is provided to the computing device associated with the first user.

33 Claims, 4 Drawing Sheets

PROVIDING CUSTOMIZED AUTOCOMPLETE DATA

BACKGROUND

This specification generally relates to providing customized autocomplete data.

Entering user input using computing devices is a common activity, and text is a common form of user input. Entering text and other input to computing devices can be time consuming. In addition, erroneous keystrokes on a physical or virtual keyboard may need to be corrected, further complicating the entry of input.

SUMMARY

A computing device can present autocomplete suggestions that are customized for a user of the computing device. The computing device can use customized autocomplete data, stored in an autocomplete cache of the computing device, to generate the customized autocomplete suggestions. The data in the cache can be periodically refreshed with updates that are specific to a particular user or a group of users. Different autocomplete cache updates can be provided to computing devices associated with different users, resulting in the presentation of different autocomplete suggestions to the different users.

The data in a customized autocomplete cache update can be generated using search queries submitted by other users. In particular, a customized update for a first user can be generated based on the usage of words and phrases in search queries submitted by other users that have attributes in common with the first user. Generally, users that have similar interests or other similarities are likely to enter similar words and phrases. Therefore, in many instances, a first user is likely to user words and phrases that similar users have already used.

To generate a customized autocomplete cache update, for example, profile data for a particular first user can be compared with profile data for other users that submitted various search queries. Search queries submitted by users determined to be similar to the first user can be selected, and used to generate the data for an autocomplete cache update for the first user.

One innovative aspect of the subject matter described in this specification is embodied in methods that include the actions of: obtaining first profile data for a first user that is associated with a computing device; obtaining second profile data for second users that submitted search queries, the second users being different from the first user; determining, based on the first profile data and the second profile data, similarity scores that are each indicative of a degree of similarity between the first user and at least one of the second users; selecting a proper subset of the search queries based on the similarity scores; generating an update for an autocomplete cache of the computing device associated with the first user using the selected subset of the search queries; and providing the update to the computing device associated with the first user.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, selecting the proper subset of the search queries based on the similarity scores includes selecting a particular search query based on one of the similarity scores that is indicative of a degree of similarity between the first user and one of the second users that submitted the particular search query. Selecting the proper subset of the search queries based on the similarity scores includes: determining whether each of the similarity scores exceeds a threshold similarity score and selecting the search queries for which it is determined that the similarity score that is indicative of a degree of similarity between the first user and the second user that submitted the search query exceeds the threshold similarity score. Selecting the proper subset of the search queries based on the similarity scores includes: selecting a proper subset of the second users, the subset of the second users comprising second users for which a corresponding similarity score exceeds a threshold similarity score, and selecting the search queries submitted by the second users in the proper subset of the second users as the subset of the search queries.

Obtaining first profile data for the first user of a computing device includes obtaining information that indicates a first context of the computing device, obtaining second profile data for the second users includes obtaining information that indicates second contexts in which the respective search queries were submitted, and determining the similarity scores includes determining similarity scores that are each indicative of a degree of similarity between the first context and the respective second contexts. Obtaining the first profile data for the first user includes obtaining current profile data for the first user, and obtaining second profile data for the second users includes obtaining profile data corresponding to times when the search queries were submitted. Obtaining the first profile data for the first user includes obtaining information indicating a first geographical location, obtaining the second profile data for the second users includes obtaining information that indicates second geographical locations from which the respective search queries were submitted, and determining the similarity scores includes determining the similarity scores based on distances between the first geographical location and the respective second geographical locations. Obtaining information indicating the first geographical location includes receiving information indicating a current location of the computing device.

Obtaining the first profile data for the first user includes obtaining information that indicates a user type for the first user, and obtaining the second profile data for the second users includes obtaining information that indicates user types for the second users. Determining the similarity scores includes: determining whether the user type for first user matches the user types for the respective second users, and determining the similarity scores based on whether the user type for the first user matches the user type for the respective second users. Obtaining the first profile data for the first user includes obtaining first demographic information for first user, obtaining the second profile data for the second users includes obtaining second demographic information for the respective second users, and determining the similarity scores includes determining the similarity scores based on commonalities between the first demographic information and the second demographic information. Obtaining the first profile data for the first user includes obtaining a first search query history for the first user, obtaining the second profile data for the second users includes obtaining second search query histories for the second users, and determining the similarity scores includes determining the similarity scores based on commonalities between the first search query history and the respective second search query histories.

Advantageous implementations can include one or more of the following features. The usefulness of autocomplete suggestions can be improved. Autocomplete suggestions can be customized for the interests, attributes, and behavior of a particular user or a group of users. Using an autocomplete cache, personalized autocomplete suggestions can be generated when a network connection is unavailable. Using the autocomplete cache, personalized autocomplete suggestions can be presented in a manner that limits network latencies. The autocomplete cache can be updated to reflect current topics and trends in word usage, especially topics and trends among users with similarities to a particular user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
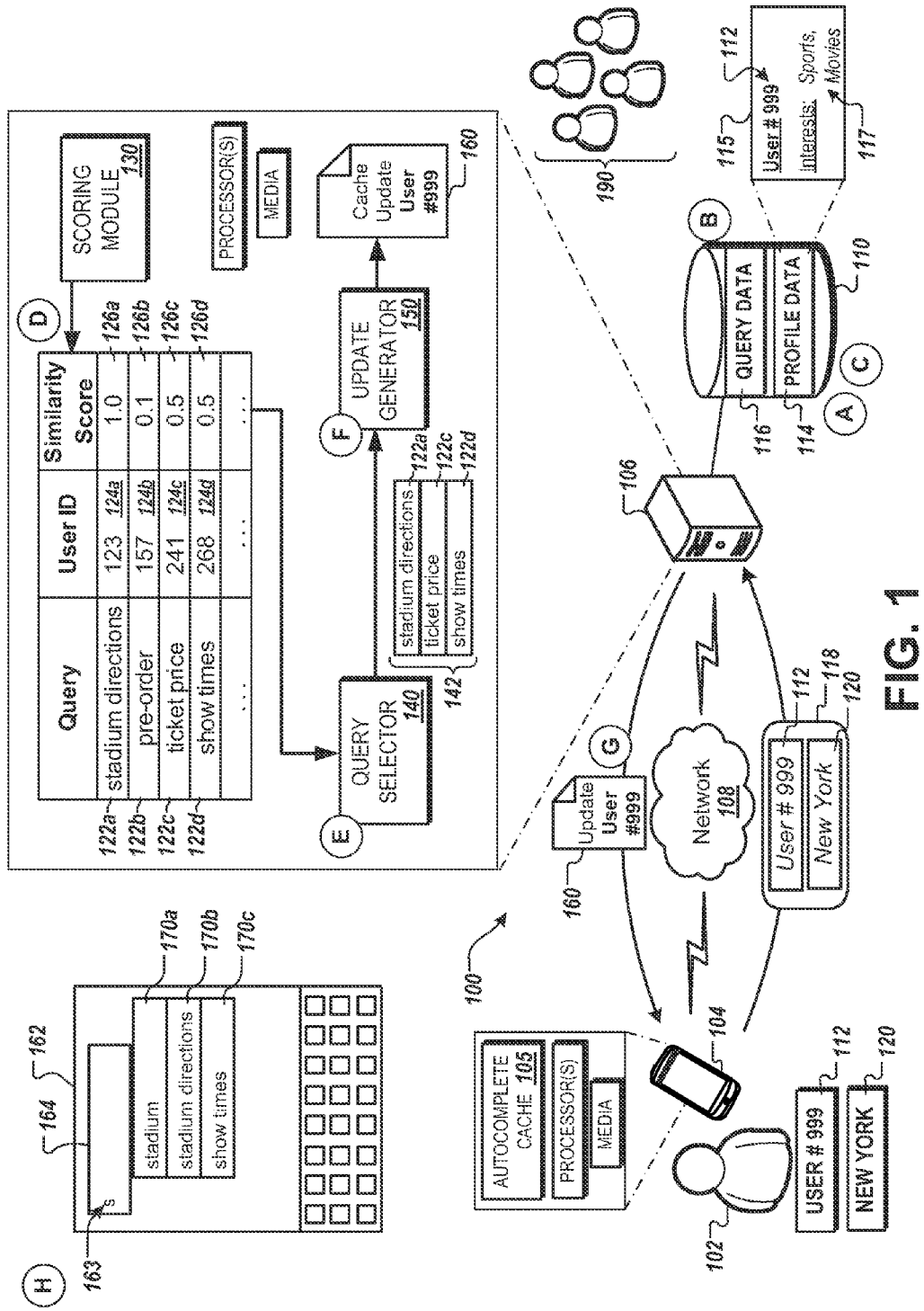
FIG. 1 is a diagram that illustrates an example of an environment in which customized autocomplete data are provided.

Customized autocomplete data can be provided as a customized update to an autocomplete cache of a computing device. Many computing devices use a cache or local memory to store data that is used to produce autocomplete suggestions. Updates to the autocomplete cache that are personalized for a particular user or a group of similar users can improve the likelihood that the computing device presents autocomplete suggestions that are useful (e.g., autocomplete suggestions that users select or accept).

Because users have differing interests and characteristics, users frequently do not find the same autocomplete suggestions to be useful. Users entering the same characters can intend substantially different inputs. For example, a user that has been identified as a sports fan ("sports fan") may initially enter "ba" while entering the query "baseball scores," and a user that has been identified as a shopper ("shopper") may enter "ba" to enter "bargain footwear" as a query. Because different queries are intended, different autocomplete suggestions may be appropriate. As described further below, autocomplete suggestions can be presented to each user using customized autocomplete cache data that reflects their different interests. For example, the sports fan can receive an autocomplete cache update based on search queries that other users that have been identified as sports fans ("other sports fans") have submitted, and the shopper can receive an autocomplete cache update based on search queries submitted by other users that have been identified as shoppers ("other shoppers"). When the updates are applied, a computing device for the sports fan uses its updated cache to present words and phrases used by other sports fans as autocomplete suggestions. A computing device for the shopper uses its updated cache to present words and phrases used by other shoppers as autocomplete suggestions.

A system can generate a customized autocomplete cache update for a particular user using search queries submitted by other users. From a collection of search queries submitted by different users, the system can select a subset of search queries based on similarities between the particular user and the users that submitted the search queries. For example, the subset of the search queries can include search queries submitted by users that have attributes in common with the particular user (e.g., users that have interests, demographic characteristics, or geographical locations that are the same as or are similar to those of the particular user). When at least a threshold level of similarity exists between a second user and the particular user, search queries submitted by the second user can be included in the subset. When the level of similarity between a second user and the particular user is less than the threshold level, search queries submitted by the second user can be excluded from the subset.

The system can use the selected subset of search queries as a custom source of word usage data. For example, the system can generate a customized update based on word usage in the subset of search queries that have been submitted by users that have been determined to be similar to the particular user. Because the users that submitted the search queries in the subset have commonalities with the particular user, the autocomplete suggestions provided using the customized data can be more useful to the particular user than autocomplete suggestions generated using generic autocomplete data.

As an example, to provide a personalized autocomplete cache update for a first user, the system can obtain first profile data for the first user. The system can obtain second profile data for second users that submitted search queries. The second users can be different from the first user. The system can determine based on the first profile data and the second profile data, similarity scores that are each indicative of a degree of similarity between the first user and at least one of the second users. The system can select a proper subset of the search queries based on the similarity scores, and generate an update for an autocomplete cache of a computing device associated with the first user using the selected subset of search queries. The system can then provide the update to the computing device associated with the first user.

FIG. 1 is a diagram that illustrates an example of an environment 100 in which customized autocomplete data are provided. The environment 100 includes a computing device 104 and a server system 106 that communicate over a network 108. The diagram shows states (A) to (H), which may occur in the sequence illustrated or in a different sequence. States (A) to (G) illustrate a flow of data, and state (H) illustrates a user interface.

The computing device 104 can be, for example, a desktop computer, a laptop computer, a cellular phone, a smartphone, a personal digital assistant (PDA), a tablet computer, a navigation system, or another computing device. The operations performed by the server system 106 can be performed by individual computer systems or can be distributed across multiple computer systems. The server system 106 accesses and stores data on one or more data storage devices 110, which can be connected directly or over the network 108. The network 108 can be wired or wireless or a combination of both. The network 108 can include one or more public or private networks, and can include the Internet.

The computing device 104 facilitates entry of user input by providing suggested inputs to a user 102. For example, when the user 102 enters one or more characters, the computing device 104 can provide autocomplete suggestions that are selected using the entered one or more characters. The autocomplete suggestions that are provided can include words or phrases that include the one or more characters that were entered by the user 102. For example, when a user inputs partial words or partial phrases, the computing device 104 can suggest completed words or extended phrases. The autocomplete suggestions can also include words or phrases that are similar to (e.g., synonyms of or spelling corrections of) the user input. The user 102 can interact with (e.g., tap, click, or otherwise affirmatively select) one of the provided autocomplete suggestions to enter the suggested text. As used herein, a word includes a single term. A phrase includes a set of one or more words, which may be arranged in a particular sequence.

The computing device 104 uses data stored as a local autocomplete cache 105 to determine which autocomplete suggestions to present. The autocomplete cache 105 is stored on a data storage device of the computing device 104, for example, a memory device housed within or physically connected to the computing device 104. The autocomplete cache 105 can indicate words, phrases, and/or portions of words, as well as corresponding usage statistics. For example, the data in the autocomplete cache 105 can identify (e.g., list or otherwise specify) words and phrases, and can provide measures that affect a likelihood that the words and phrases will be selected as autocomplete suggestions. The measures can include usage scores or rankings of the words and phrases relative to each other.

The likelihood that the user 102 will enter a word or phrase can be estimated based on the relative frequencies with which the word or phrase is used in a source set of text. A word or phrase that is common in the source set can be more likely to be entered by the user 102 than, for example, a word or phrase that is less common in the source set. Thus the usage statistics for the source set can be used to determine measures that affect the selection of autocomplete suggestions.

For purposes of example, assume that in states (A) to (H) the server system 106 generates an autocomplete cache update 160 that is customized for the user 102. As described below, the server system 106 obtains profile data for multiple users 190, determines similarity scores 126a-126d, and selects search queries 122a-122d based on the similarity scores 126a-126d. The server system 106 then uses the selected search queries to generate the autocomplete cache update 160 for the user 102. The server system 106 provides the update 160 to the computing device 104, which uses the updated autocomplete cache 105 to present autocomplete suggestions 170a-170c to the user 102.

The server system 106 can generate and send autocomplete cache updates in response to or independent of interaction with the computing device 104. In some implementations, updates are pushed to the computing device 104, asynchronously to any communications or actions from the computing device 104. Updates can be sent periodically, for example, weekly, daily, or multiple times a day. In addition, or as an alternative, updates can be sent in response to a communication from the computing device 104, whether the communication is a request for a cache update or an interaction for another purpose. For example, the server system 104 can provide an autocomplete cache update to the computing device 104 in response to receiving a search query or other information from the computing device 104.

In further detail, in state (A), the server system 106 obtains profile data 115 for the user 102. The profile data 115 can be information associated with a user identifier 112 corresponding to the user 102. The profile data can be accessed from, for example, user profile data 114 stored by the one or more data storage devices 110. In addition, or as an alternative, the profile data 115 can include information received from the computing device 104 or from other sources. In some implementations, the profile data 115 for the user 102 indicates attributes of or historical or behavioral information about the user 102. Examples of profile data include geographical locations, demographic information, search query histories, web browsing histories, a user type, and user interests.

For privacy protection, any personal, historical, behavioral, or other data may be stored on an opt-in basis. Stored data can be anonymized by various approaches. For example, user profile data, search history data, and location data can by anonymized for privacy protection, so that the data, if compromised, cannot be associated with a particular user or user identifier. Various anonymization processes, such as hashing, encryption, and obfuscation techniques may be used to ensure that user privacy is protected.

The user identifier 112 can uniquely identify the user 102 or the computing device 104. The user identifier 112 can be, for example, an identifier for a user account of the user 102, a value stored in a cookie on the computing device 104, a device identifier for the computing device 104, an IP address of the computing device 104, or another identifier that corresponds to the user 102.

In the illustrated example, the server system 106 accesses profile data 115 associated with the user identifier 112, which has a value of "999" and corresponds to the user 102. The server system 106 determines that interests 117 of the user 102 include "sports" and "movies." The server system 106 also receives additional profile data for the user 102 in a message 118 from the computing device 104. In this instance, the received profile data includes a geographical location 120, which indicates that the user 102 is currently in New York. The message 118 can be sent by the computing device 104 as a request for an autocomplete cache update or be sent for another purpose, such as to submit a search query.

The geographical location 120 can be a device location of the computing device 104, for example, the current location of the computing device 104. The computing device 104 can determine its current location using, for example, a global positioning system (GPS) receiver module. As an alternative, a user can provide a geographical location 120, for example, an address, zip code, city or other geographical information. In some implementations, the geographical location 120 is a prior location of the user 102, for example, a geographical location determined based on a prior interaction with the server system 106 or another server system.

In addition, or as an alternative, the computing device 104 or the server system 106 can determine the geographical location 120 based on, for example, an IP address for the computing device 104, information about the location of a wireless access point or a cellular network cell site to which the computing device 104 is connected, or using other techniques. The geographical location 120 can be a default location or a previous location for the computing device 104, for example, a home location, a work location, a last known location, or a frequent location of the computing device 104.

In state (B), the server system 106 obtains search query data 116. The search query data 116 includes information about a set of search queries 122a-122d submitted by one or more of users 190, for example, users different from the user 102. The search query data 116 can include search query histories for each of the users 190. Each search query 122a-122d can include, for example, text that one or more of the users 190 submitted to an Internet search engine.

The search query data 116 can indicate the content of the search queries 122a-122d (e.g., the text of each search query 122a-122d) and a user identifier 124a-124d for the user 190 that submitted the search query 122a-122d. The search query data 116 can also indicate one or more of, for example, a date or time a search query was submitted, a geographical location where the search query was submitted, and other context information related to the search query. Information about the search queries 122a-122d can be stored in an index, table, database, or any other appropriate data structure or format.

In the illustrated example, the server system 106 accesses search queries 122a-122d that include "stadium directions," "pre-order," "ticket price," and "show times." The search queries 122a-122d were submitted by different users 190, as indicated by the different user identifiers 124a-124d.

In state (C), the server system 106 obtains profile data for the users 190 that submitted the search queries 122a-122d. For example, the server system 106 can access information about the particular user 190 associated with each user identifier 124a-124d. The profile data for the users 190 can be of the same type or of a similar type to the profile data obtained for the user 102 (e.g., information about user interests and a geographical location). Thus, the profile data can include attributes of or historical or behavioral information about the users 190 that submitted the search queries 122a. Examples of profile data include geographical locations, demographic information, search query histories, web browsing histories, and user interests.

In the illustrated example, the server system 106 determines user interests for each of the users 190 using stored user profile data 114. The server system 106 also determines geographical locations associated with the users 190. For example, the geographical locations can be geographical locations from which the respective search queries 122a-122d were submitted, as indicated by the search query data 116.

In some implementations, the server system 106 obtains current profile information for the users 190. For example, the profile data can be information about the current user interests of the users 190. In some implementations, the server system obtains historical profile data corresponding to times when the search queries 122a-122d were submitted. Because the user interests, geographical locations, and other profile data can change over time, the profile data obtained can indicate the information or context when a particular query was submitted. As a result, the profile data obtained can indicate the user interests of a user 190 when the query was submitted, the geographical location from which the query was submitted, and so on.

In state (D), the server system 106 assigns similarity scores 126a-126d based on the profile data for the user 102 and the profile data for the users 190. The server system 106 can include a scoring module 130 that assigns the similarity scores 126a-126d. The similarity scores 126a-126d can indicate degrees of similarity between the user 102 and the respective users 190 that submitted the search queries 122a-122d. For example, the similarity score 126a for the search query 122a is indicative of similarity between profile data for the user 102 and profile data for the user 190 that submitted the search query 122a (who is associated the user identifier 124a). The similarity score 126b for the search query 122b is indicative of similarity between profile data associated with the user identifier 112 and profile data for the user 190 that submitted the search query 122b (who is associated with the user identifier 124b), and so on.

Figure 2:
FIG. 2 illustrates examples of data that can be used to generate customized autocomplete data.

FIG. 2 illustrates examples of data that can be used to generate customized autocomplete data. A table 200 illustrates data that can be used by the scoring module 130 to generate the similarity scores 126a-126d. The scoring module 130 assesses similarities between the user 102 and each of the users 190 for one or more criteria. The similarity scores 126a-126d can thus be based on similarities between a single attribute of the users 102, 190 or multiple attributes. The scoring module 130 can assign sub-scores for the different criteria and then combine the sub-scores to generate the similarity scores 126a-126d, which can indicate the overall levels of similarity between the user 102 and the users 190 across multiple criteria.

In some implementations, a single similarity score indicates similarity between the user 102 and a particular user 190. The server system 106 can determine whether to select multiple search queries that were submitted by the particular user 190 based on the single similarity score for the particular user 190. Current profile data for the users 190 and current profile data for the user 102 can be used to determine the similarity scores.

In some implementations, multiple similarity scores are determined for each user 190. Different similarity scores can be determined for different search queries. For each search query submitted by a user 190, for example, a query-specific similarity score can be determined that takes into account the environment, circumstances, or context particular to the submission of that search query. Thus when a user 190 submits a first query in a first context and submits a second query in a second context, the query-specific similarity scores can indicate different degrees of similarity between the user 190 and the user 102. A query-specific similarity score can be determined using profile data corresponding to the time the search query was submitted, for example, the geographical location of the user 190 when the search query was submitted, or the interests of the user 190 at the time the query was submitted.

In the illustrated example, the scoring module 130 determines the similarity scores 126a-126d based on geographical locations and user interests. The scores are illustrated as numerical values, and higher values indicate greater degrees of similarity. Similarity scores can be expressed using other measures in addition to or as an alternative to numerical values, for example, as binary values, strings, associations in an index or database, and other forms of data. For example, a similarity score can be a binary value representing a determination whether a user that submitted one or more search queries has at least a minimum level of similarity with the user 102.

The profile data obtained in state (C) includes a geographical location 210a-210d and user interests 220a-220c corresponding to each user 190, as indicated by the different user identifiers 124a-124d. The information can be linked to the particular context in which the search query 122a-122d was entered, or can be general information about the user 190 that submitted the search query 122a-122d. For example, the geographical locations 210a-210d can be geographical locations from which the corresponding the search query 122a-122d was submitted. In addition, or as an alternative, the geographical locations 210a-210d can be home locations, work locations, or other locations that are associated with the corresponding users 190 but do not necessarily describe the specific context in which the search query 122a-122d was submitted.

The scoring module 130 determines location scores 215a-215d that indicate degrees of similarity between the geographical locations 210a-210d and the geographical location 120. To assign the location scores 215a-215d, the scoring module 130 compares the geographical locations 210a-210d with the geographical location 120d. As an example, the current geographical location 120 of the user 102 can be compared with locations where the search queries 122a-122d were submitted. As another example, a home location of the user 102 can be compared with home locations of the users 190.

The scoring module 130 can determine distances between the geographical locations 210a-210d and the geographical location 120. In some implementations, the smaller the distance between locations, the more similar the locations are considered to be. For example, the geographical locations 210a, 210d are the same as the geographical location 120, and thus are assigned location scores 215a, 215d that indicate a higher degree of similarity than the location scores 215b, 215c, which correspond to geographical locations 210b, 210c that are farther from the geographical location 120.

The scoring module 130 also determines interest scores 225a-225d that indicate degrees of similarity between the interests 220a-220d and the interests 117 of the user 102. The scoring module 130 compares the interests 220a-220d with the interests 117 of the user 102. For example, the interest scores 225a-225d are assigned such that matching interests result in interest scores 225a-225d that indicate higher similarity than interests that do not match. Two of the interests 220a ("sports"), 220c ("movies") are listed as interests 117 of the user 102, and so corresponding search queries 122a, 122c are assigned interest scores 225a, 225c that indicate higher similarity than interests that do not match the interests 117. Multiple shared interests can result in a score that indicates a higher degree of similarity than for a single shared interest.

In the illustrated example, the scoring module 130 assigns the similarity scores 126a-126d by adding the location score 215a-215d and the interest score 225a-225d corresponding to each search query 122a-122d. Other methods of combining scores can be used, including, for example, weighting the influence of the scores for different criteria with different weighting values.

In general, other criteria can be used to assess similarities between the user 102 and the users 190. As an example, users can be classified into a plurality of predetermined types, and the similarity scores 126a-126d can indicate whether the users 190 are of the same user type as the user 102. As another example, the similarity scores 126a-126d can reflect similarities in demographic information (e.g., age, sex, language(s) used, profession, etc.) between the users 190 and the user 102. Further, the similarity scores 126a-126d can indicate commonalities among the search query history of the user 102 and the search query histories of the users 190. For example, the similarity scores 126a-126d can be based on an extent to which the respective users 190 have previously used the same words or phrases, or similar words or phrases, as the user 102 in search queries. In a similar manner, the similarity scores 126a-126d can be based on commonalities in browsing histories, for example, a degree to which the users 190 have navigated the same web pages or domains, or to web pages or domains associated with similar content or topics, as those navigated to by the user 102.

In some implementations, scores are assigned to sets of search queries rather than individual search queries. For example, the server system 106 can assign a similarity score to a particular second user 190 that indicates a degree of similarity between the particular second user 190 and the user 102. The server system 106 can use the similarity score for the user 190 as the similarity score for several of or all of the queries submitted by the particular second user 190.

Referring again to FIG. 1, in state (E), the server system 106 selects a subset 142 of the search queries 122a-122d based on the similarity scores 126a-126d. The server system 106 can select a proper subset of the search queries 122a-122d (e.g., such that fewer than all of the search queries 122a-122d are selected). The subset 142 can be selected to include the search queries 122a-122d associated with similarity scores that indicate the highest degrees of similarity. In other words, the subset 142 can include the search queries 122a-122d that were submitted by users 190 determined to be most similar to the user 102.

In some implementations, the subset 142 is selected to include search queries 122a-122d for which the associated similarity score 126a-126d satisfies a threshold. In the illustrated example, the query selector 140 uses a threshold value of 0.5. Search queries assigned a similarity score with a value of 0.5 or higher are selected, and search queries with similarity scores below 0.5 are not selected. As a result, each of the search queries in the subset 142 was submitted by a user 190 that has at least a minimum level of similarity with the user 102.

In some implementations, the subset 142 is selected to include the N search queries 122a-122d, where N is an integer, and thus a particular number of search queries 122a-122d is selected. The search queries 122a-122d can be ranked according to the similarity scores 126a-126d, and a highest-ranking set of the search queries 122a-122d can be selected.

Other processing can also be performed to select the subset 142. For example, the set of search queries 122a-122d or the subset 142 can be filtered to include only queries in languages used by the user 102.

In state (F), the server system 106 generates the autocomplete cache update 160 using the search queries 122a, 122c, 122d in the subset 142. The server system 106 can include an update generator 150 that generates autocomplete data for the update 160. The update generator 150 assesses the usage of words and phrases in the subset 142 and generates the update 160 based on that usage. As used herein, usage data can also include information about non-usage of a word or phrase.

The search queries in the subset 142 include words and phrases that the user 102 may be likely to use. For example, users in nearby geographical locations may be likely to use the same words and phrases. When the user 102 is in New York, the user 102 may be likely to use words and phrases that other users 190 used while in New York. Users that have common interests may also use the same words and phrases. As a result, the update generator 150 can use the subset 142 as a data set that models expected usage by the user 102. The update 160 is generated so that, when the autocomplete cache 105 is updated with the update 160, the computing device 104 is more likely to present words and phrases in the subset 142 as autocomplete suggestions than with the prior content of the autocomplete cache 105.

The update generator 150 can identify each word and phrase that occurs in the subset 142. The update generator 150 can also assign a usage score to the identified words and phrases based on a number of occurrences in the subset 142. The usage scores can indicate, for example, the relative frequencies that each of the identified words and phrases occur in the subset. The usage score can be a normalized value, for example, a number of occurrences divided by the number of search queries in the subset 142. Other statistics can also be used to determine the usage scores. For example, the usage scores can indicate a relative ranking of words and phrases based on usage statistics.

The update 160 can identify some or all of the identified words and phrases and can indicate corresponding usage scores. For example, the update 160 can identify new words and phrases that were not previously identified by the autocomplete cache 105. The update 160 can additionally or alternatively identify new usage scores for words and phrases already identified by the autocomplete cache 105.

In some implementations, the search queries 122a, 122c, 122d in the subset 142 have a greater weight or influence in generating the update 160 than, for example, search queries that are not included in the subset 142. The occurrence of a word or phrase in the subset 142 can have a greater effect, or a different effect, on the data in the update 160 than the occurrence of the same word or phrase in a search query that is not included in the subset 142. For example, usage scores or other measures that affect the likelihood that a word or phrase is presented as an autocomplete suggestion can be increased more when a word or phrase occurs in the subset 142 than when the word or phrase that occurs only in a search query that is not included in the subset 142. In some implementations, the server system 106 uses only search queries in the subset 142 to generate the update 160, and ignores search queries that are not included in the subset 142.

In some implementations, the update 160 is an incremental update to the autocomplete cache 105, avoiding repetition of data already present in the autocomplete cache 105. The update generator 150 can store data about what is known to be or is expected to be in the autocomplete cache 105. The update generator 150 can generate the update 160 such that it specifies changes from the current state of the autocomplete cache 105. As an alternative, the update 160 can replace the entire autocomplete cache 105.

In some implementations, the update generator 150 can combine customized autocomplete data determined using the subset 142 with other autocomplete data, which may not be customized for the user 102. For example, words and phrases that are popular or are commonly used in the set of search queries 122a-122d as a whole can also be indicated in the update 160, in addition to customized entries based on the subset 142. The update 160 can provide customized autocomplete data that supplements a standard set of non-customized autocomplete data that is maintained in the autocomplete cache 105.

In some implementations, the autocomplete cache update 160 is unique to a single user 102. Alternatively, multiple users having similar attributes can receive the same update. For example, users that are located in a particular geographical area and have the same interests can receive the same autocomplete cache update.

The update 160 can also be generated based on text entered by the user 102, for example, search queries or other text submitted by the user 102 using different computing devices. The update generator 150 can obtain information about text entered on one or more computing devices that are associated with the user identifier 112, including the computing device 104 and computing devices different from the computing device 104. The update 160 can increase a likelihood that words and phrases that the user 102 has previously entered using any of multiple devices will subsequently be presented as autocomplete suggestions. The update 160 can also be provided to multiple computing devices associated with the user identifier 112.

In state (G), the server system 106 sends the update 160 to the computing device 104. The update 160 is sent to a computing device that is associated with the user 102. A computing device can be associated with a user when, for example, a user account for the user is active on the computing device, or the computing device stores or provides the user identifier. In some implementations, a cookie stored on a computing device or an IP address of a computing device can be an identifier for the user 102.

The computing device 104 applies the update 160, which alters the content of the autocomplete cache 105. The update 160 can alter the set of words or phrases that the autocomplete cache 105 identifies as potential autocomplete suggestions or portions thereof. For example, words or phrases that occur in the subset 142 can be added or can replace other words and phrases. As another example, words or phrases that do not occur in the subset 142, or occur infrequently in the subset 142, can be removed. In addition, or as an alternative, the update 160 can alter measures that affect the likelihood that different words and phrases are presented as autocomplete suggestions. As an example, the usage scores can be increased or decreased based on the usage in the subset 142.

In state (H), the computing device 104 uses the updated autocomplete cache 105 to present autocomplete suggestions 170a-170c. For example, the autocomplete suggestions 170a-170c can be presented on a user interface 162 of the computing device 104 in response to a user input or action.

In the illustrated example, the user 102 enters an input 163, "s," into a text field 164. The computing device 104 uses information in the updated autocomplete cache 105 to select the autocomplete suggestions 170a-170c for presentation. For example, from words and phrases and corresponding usage data identified by the autocomplete cache 105, the computing device 104 determines that "stadium," "stadium directions," and "show times" are likely completions for the user input 163. The computing device 104 selects these as autocomplete suggestions 170a-170c and displays them on the user interface 162. The displayed autocomplete suggestions 170a-170c include words and phrases used by users 190 that were determined to be similar to the user 102.

In some implementations, the autocomplete update 160 is an update for a general-purpose autocomplete cache of the computing device 104. For example, when autocomplete data in the update 160 is generated based on search query data, the updated autocomplete cache can be used to provide autocomplete suggestions for search queries or text other than search queries. The autocomplete cache 105 can be used to provide autocomplete suggestions for, for example, non-query fields of applications and web pages, text documents, and other non-query text, in addition to or instead of being used to produce autocomplete suggestions for search queries.

In some implementations, the autocomplete cache 105 is a special-purpose autocomplete cache that is used to generate autocomplete suggestions for a particular context or use. For example, the autocomplete cache 105 can be used primarily for, or only for, generating autocomplete suggestions for search queries. The computing device 104 can use the autocomplete cache 105, which is updated based on search queries of other users 190, to present autocomplete suggestions in response to determining that an input field is designated for receiving a search query. The computing device 104 can determine that an input field is designated for receiving a search query based on, for example, metadata or other content of a web page. For example, the computing device 104 may determine that a selected input field is an HTML5 search box and therefore is designated for receiving a query. The computing device 104 can include autocomplete cache data for each of multiple different input contexts, and the server system 106 can provide different autocomplete cache updates for the different input contexts. For example, the autocomplete cache 105 may include different sets of usage scores corresponding to the different input contexts. Thus, autocomplete suggestions presented when the user 102 enters a search query can be different from autocomplete suggestions when the user enters other text input.

In general, the functions described above can be repeated at various times to provide additional updates to the computing device 104. In some implementations, each update is based on search queries submitted over a particular period of time, for example, during the previous month, week, or day, or hour. Updates can be based on search queries that were recently submitted by other users 190, permitting the update to reflect developing usage trends. Multiple intraday updates can be provided, permitting the autocomplete cache 105 to be dynamically updated according to the most recent search queries submitted. Also, as the location, context, and profile data for the user 102 change, new updates can be provided to allow autocomplete suggestions that are more relevant to the new circumstances of the user 102.

Figure 3:
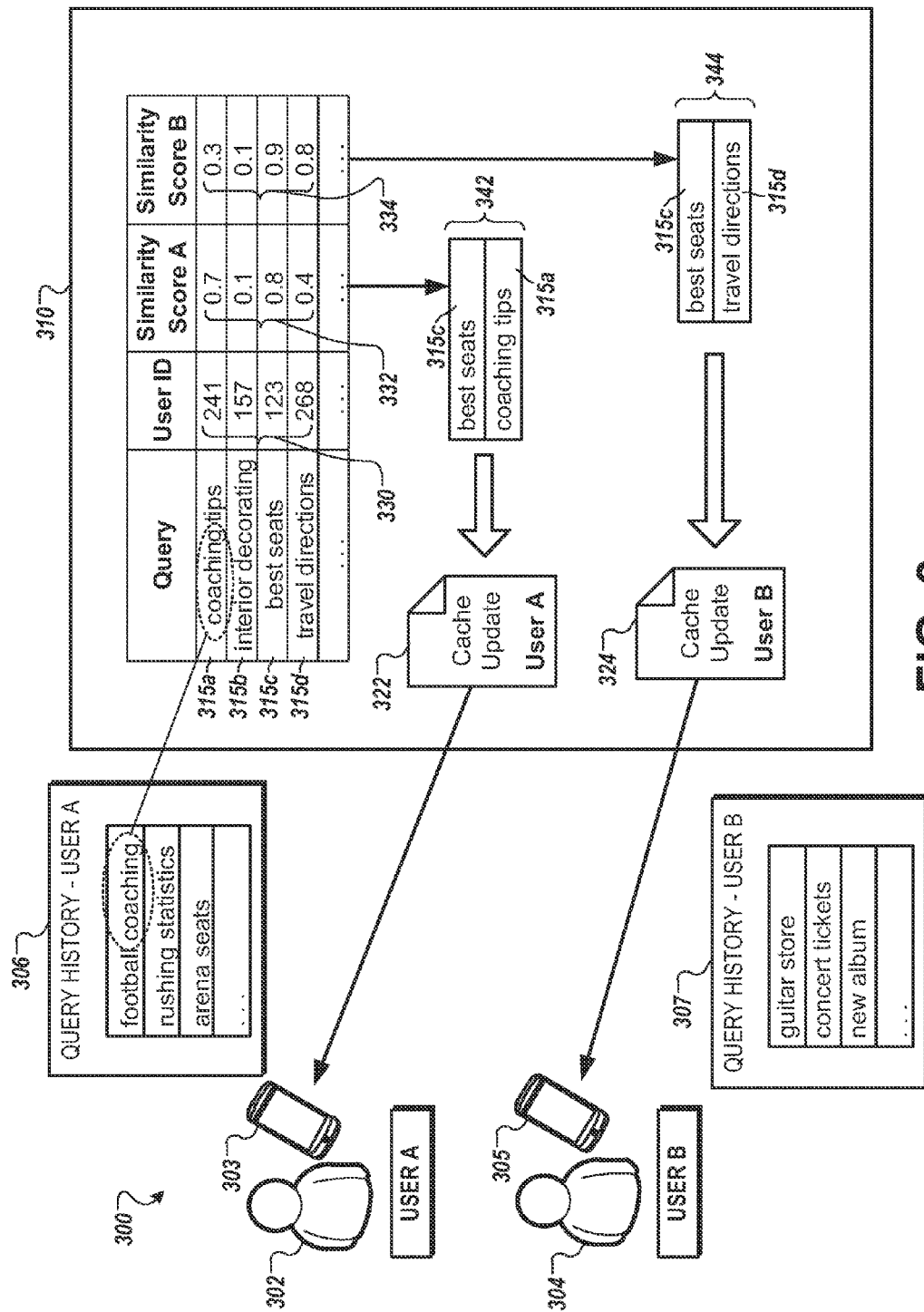
FIG. 3 is a diagram that illustrates an example of an environment in which customized autocomplete data are provided.

FIG. 3 is a diagram that illustrates an example of an environment 300 in which customized autocomplete data are provided. The environment 300 includes a server system 310 that provides autocomplete cache updates 322, 324 to two different computing devices 303, 305. Each computing device 303, 305 is associated with a different user 302, 304 and receives different autocomplete cache update 322, 324 (e.g., an update with different autocomplete data).

The server system 310 generates the updates 322, 324 using information about the search query histories 306, 307 of the users 302, 304. The server system 310 compares the search query histories 306, 307 with search query histories of users that submitted various search queries 315a-315d.

The server system 310 assigns similarity scores 330 that indicate degrees of similarity between the search query history 306 and the search query histories of the respective users that submitted the queries 315a-315d. For example, the server system 310 determines that search query history corresponding to the user identifier "241" and the search query 315a includes the word "coaching," which is included in the search query history 306 for the user 302. Based on this commonality, and potentially other or different similarities, the server system 310 assigns a similarity score 332 for the search query 315a, indicating a relatively high degree of similarity between the user 302 and the user that submitted the search query 315a (e.g., the user corresponding to the user identifier "241").

The server system 310 also assigns similarity scores 334 that indicate degrees of similarity between the search query history 307 and the search query histories of the respective users that submitted the queries 315a-315d. Because the search query histories 306, 307 of the users 302, 304 have differing degrees of similarity with the search query histories of the users that submitted the search queries 315a-315d, the similarity scores 332, 334 are different for the different users 302, 304.

Based on the similarity scores 332, 334, the server system 310 selects subsets 342, 344 of the search queries 315a-315d with which to generate the autocomplete cache updates 322, 324. For example, search queries 315a-315d associated with similarity scores that exceed a threshold similarity score of "0.5" are selected. Because the similarity scores 332, 334 are different for the different users 302, 304, the subsets 342, 344 contain different search queries. Accordingly, the updates 322, 324 are generated to include different autocomplete data. For example, the updates 322, 324 can identify different words or phrases. In addition, or as an alternative, the updates 322, 324 can identify different usage scores, rankings, or other measures that affect whether particular words and phrases are displayed as autocomplete suggestions.

After the computing devices 303, 305 apply the corresponding updates 322, 324, the computing devices 303, 305 have different data in their autocomplete caches. As a result, in at least some instances, the computing devices 303, 305 can present different autocomplete suggestions to the users 302, 304 in response to the same user inputs.

Figure 4:
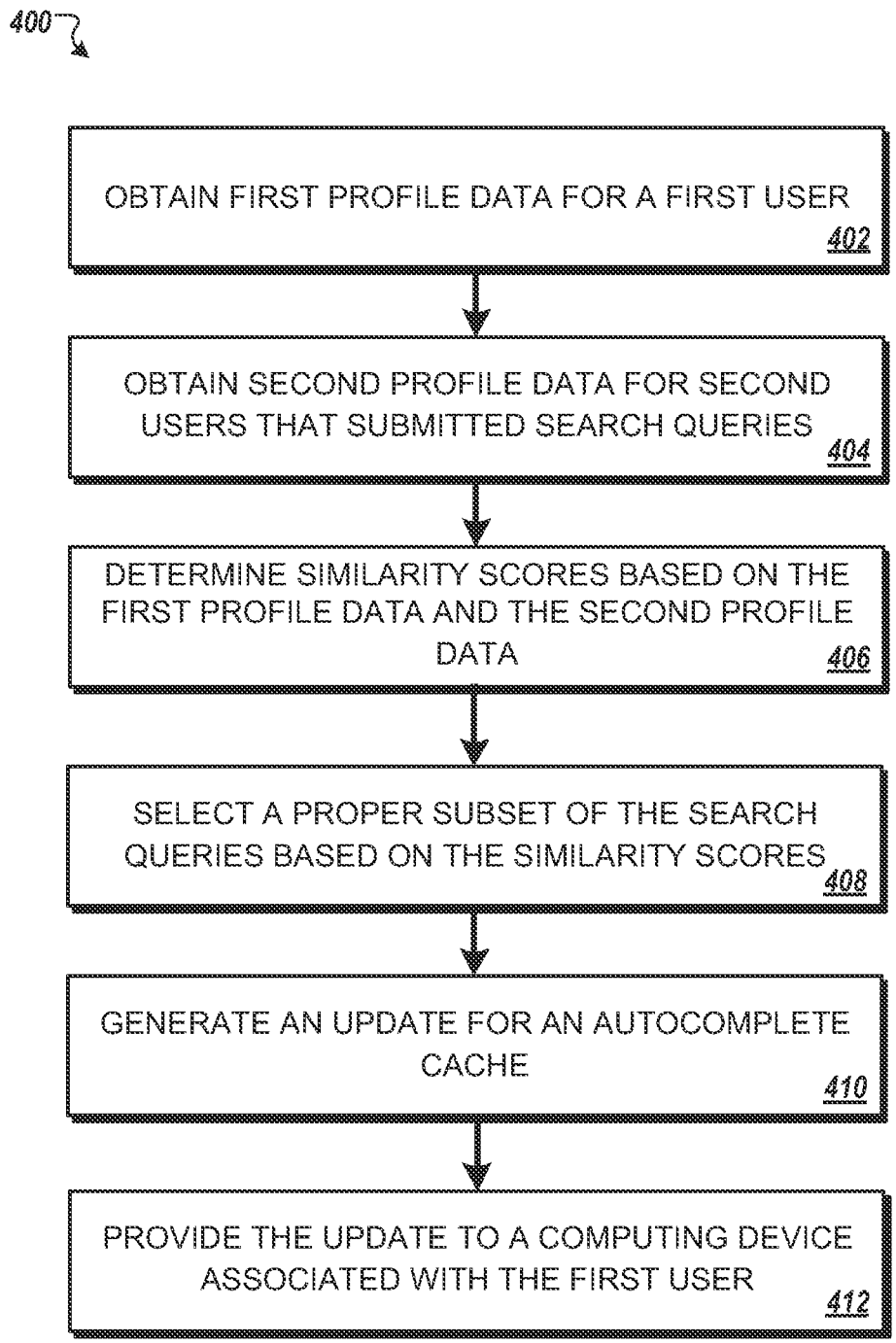
FIG. 4 is a flow diagram that illustrates an example of a process for providing customized autocomplete data.

FIG. 4 is a flow diagram that illustrates an example of a process 400 for providing customized autocomplete data. The process 400 may be performed, for example, by the server system 106 or the server system 310.

First profile data for a first user is obtained (402). For example, with respect to FIG. 1, profile data 115 is obtained for the user 102. The profile data can describe attributes or behavior of the first user. For example, the profile data can indicate a geographical location, demographic information, a search query history, a web browsing history, a user type, or other information related to the first user.

Second profile data is obtained for second users that submitted search queries (404). The second users are different from the first user. Profile data can be obtained for each of the second users. For example, with respect to FIGS. 1 and 2, profile data for the users 190 includes geographical locations 210a-210d and user interests 220a-220d. The profile data can describe attributes or behavior of the second users. For example, the profile data can indicate a geographical location, demographic information, a search query history, a web browsing history, a user type, or other information related to the respective second users.

Similarity scores are determined (406). Each similarity score is indicative of a degree of similarity between the first user and at least one of the second users. For example, with respect to FIG. 1, similarity scores 126a-126d are determined. Each similarity score can indicate a degree of similarity between the profile data for the first user and the profile data for one of the second users. In this manner, the similarity scores can be determined based on commonalities among attributes of the first user and attributes of the respective second users. In general, the more commonalities that are present between the first user and a particular second user, the higher the degree of similarity indicated by a similarity score corresponding to that particular second user.

A proper subset of the search queries is selected based on the similarity scores (408). Search queries can be selected based on the similarity score for the second user that submitted the search query. For example, with respect to FIG. 1, the subset 142 is selected based on the similarity scores 126a-126d. A particular search query can be selected based on one of the similarity scores that is indicative of a degree of similarity between the first user and one of the second users that submitted the particular search query. A search query submitted by a particular second user can be selected when the similarity score for that second user exceeds a threshold similarity score. As another example, the search queries can be ranked based on the similarity scores for the users that submitted the search queries, and a highest-ranking subset of the search queries can be selected. In general, the subset is selected to include the search queries with similarity scores that indicate the highest degrees of similarity between the first user and another user.

In some implementations, selecting a proper subset of the search queries includes selecting a proper subset of the second users for which the similarity score exceeds a threshold similarity score. The search queries submitted by the selected second users can be selected as the subset of the search queries.

In some implementations, similarity scores are determined for each search query. As a result, multiple similarity scores can be determined for a particular second user. The respective similarity scores can be indicative of degrees of similarity between a first context of the computing device associated with the first user and second contexts in which the search queries were submitted by the second users. For example, a similarity score for a search query can be indicative of similarity between a location of a computing device when the search query was submitted and the current location of the computing device associated with the first user.

In some implementations, similarity scores can be determined using current profile data for the first user and historical profile data for second users corresponding to times when the search queries were submitted. For example, a similarity score determined for a search query can be indicative of similarity between current user interests of the first user and user interests for the second user that submitted the search query when that second user submitted the search query.

An update is generated for an autocomplete cache of a computing device associated with the first user (410). The update is generated using the selected subset of search queries. For example, with respect to FIG. 1, the update 160 is generated. The autocomplete cache can be a local autocomplete cache, for example, data stored in a data storage device that is physically housed in the computing device.

The autocomplete data in the update can be generated based on usage of words in the search queries in the subset, for example, a frequency of occurrence or a relative position of words or phrases in the search queries. The autocomplete data in the update can identify one or more character sequences that occur in search queries in the subset. The autocomplete data in the update can indicate a frequency with which one or more character sequences occur in the search queries in the subset.

The search queries in the subset have a greater influence in generating the update than search queries that are not included in the subset. Usage statistics for words and phrases in the search queries in the subset can be weighted more heavily than search queries not included in the subset. The update can be generated such that, after the autocomplete cache of the computing device is updated with the update, at least some words and phrases that occur in the search queries in the subset are more likely to be presented by the computing device as autocomplete suggestions than words and phrases not occurring in the search queries in the subset. The update can increase a likelihood that at least some words and phrases that occur in the search queries in the subset are presented as autocomplete suggestions relative to, for example, a likelihood that those words and phrases would be presented using the autocomplete cache prior to the update. After the update is applied, words or phrases that occur in the search queries of the subset more commonly than in the overall set of search queries can be more likely to be presented as autocomplete suggestions by the computing device associated with the first user than to be presented by computing devices that are associated with other users and receive different updates.

In a similar manner, the update can be generated such that, after the update is applied, words and phrases that do not occur in the search queries of the subset are not presented as autocomplete suggestions by the computing device, or are less likely to be presented than before the update is applied. After the update is applied, words or phrases that occur in the search queries of the subset less commonly than in the overall set of search queries can be less likely to be presented as autocomplete suggestions by the computing device associated with the first user than to be presented on computing devices receiving different updates.

The update is provided to the computing device associated with the first user (412). For example, with respect to FIG. 1, the update 160 is provided to the computing device 104 that is associated with the user 102. The update can be provided as part of a series of periodic updates to the autocomplete cache. New autocomplete data can be provided in daily updates or in multiple intraday updates. In addition, or as an alternative, the update can be provided to a second computing device that is associated with the first user and is different from the first computing device. For example, the update can be provided to multiple computing devices associated with an identifier for the first user.

In some implementations, a communication from the computing device is received, and the update is generated for and/or provided to the computing device in response to receiving the communication. The communication from the computing device can be a request for an update to the autocomplete cache of the computing device. The communication can be, for example, a request for autocomplete suggestions for a user input, a request for a resource, or a request to execute a search query.

In some implementations, the update is provided to the computing device independent of communications from the computing device. For example, updates can be provided whether or not the computing device initiates a communication, and regardless of the timing of any communications.

In some implementations, the profile data for the first user indicates a first geographical location. For example, the first geographical location can indicate a current location of the computing device associated with the first user. The profile data for the second users can indicate second geographical locations from which the respective search queries were submitted. For example, the second geographical locations can be locations of computing devices when the search queries were submitted using the computing devices. The similarity scores can be determined based on distances between the first geographical location and the respective second geographical locations. For example, similarity scores can be determined for each of the search queries, and the similarity score for each search query can be based on the distance between the first geographical location and the second geographical location from which the search query was submitted. The value of each similarity score can be determined such that, the smaller the distance, the greater the degree of similarity indicated by the similarity score.

In some implementations, the profile data for the first user indicates a user type for the first user. The profile data for the second users indicates user types for the respective second users. To determine the similarity scores, it can be determined whether the user type for the first user matches the user types for the second users. The similarity scores can be determined based on whether the user type for the first user matches the user type for the respective second users.

In some implementations, the profile data for the first user includes demographic information about the first user. The profile data for the second users includes demographic information about respective second users. The similarity scores can be determined based on commonalities between the first demographic information and the second demographic information.

In some implementations, the profile data for the first user includes a first search query history for the first user. The profile data for the second users can include second search query histories for the respective second users. The similarity scores can be determined based on commonalities between the first search query history and the respective second search query histories. For example, the greater the number of words and phrases that occur in both the first search query history and a second search query history, the greater the degree of similarity indicated by the corresponding similarity score. A particular search query can be selected based on the similarity score that is determined based on commonalities between the first search query history and the second search query history for the second user that submitted the particular search query. In addition, or as an alternative, web browsing histories for the first user and the second users can be obtained, and similarity scores can be determined based on commonalities between the web browsing histories.

As described above, the process 400 can be used to provide the autocomplete update with autocomplete data that is customized for the first user. The process 400 can also be performed to generate and provide a different update for a different user, for example, a third user. To generate the update for the third user, different similarity scores are determined, based on profile data for the third user and the profile data for the second users. A different subset of search queries is selected, and the autocomplete update for the third user is generated to include different autocomplete data. Using the update for the third user, a computing device associated with the third user can present autocomplete suggestions for a user input (e.g., one or more characters). Because the computing devices for first user and the third user receive different updates, the autocomplete suggestions presented by the computing devices can be different in response to a particular user input (e.g., different autocomplete suggestions can be presented if both users were to enter identical input terms).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A computer-implemented method, comprising:
   obtaining first profile data for a first user that is associated with a computing device;
   obtaining second profile data for second users that submitted search queries, the second users being different from the first user;
   determining, based on the first profile data and the second profile data, similarity scores that are each indicative of a degree of similarity between the first user and at least one of the second users;
   selecting a proper subset of the search queries based on the similarity scores;
   generating an update for an autocomplete cache of the computing device associated with the first user using the selected subset of the search queries; and
   providing the update to the computing device associated with the first user.

2. The computer-implemented method of claim 1, wherein selecting the proper subset of the search queries based on the similarity scores comprises selecting a particular search query based on one of the similarity scores that is indicative of a degree of similarity between the first user and one of the second users that submitted the particular search query.

3. The computer-implemented method of claim 1, wherein selecting the proper subset of the search queries based on the similarity scores comprises:
   determining whether each of the similarity scores exceeds a threshold similarity score; and
   selecting the search queries for which it is determined that the similarity score that is indicative of a degree of similarity between the first user and the second user that submitted the search query exceeds the threshold similarity score.

4. The computer-implemented method of claim 1, wherein selecting the proper subset of the search queries based on the similarity scores comprises:
   selecting a proper subset of the second users, the subset of the second users comprising second users for which a corresponding similarity score exceeds a threshold similarity score; and
   selecting the search queries submitted by the second users in the proper subset of the second users as the subset of the search queries.

5. The computer-implemented method of claim 1, wherein:
   obtaining the first profile data for the first user comprises obtaining information that indicates a first context of the computing device;
   obtaining the second profile data for the second users comprises obtaining information that indicates second contexts in which the respective search queries were submitted; and
   determining the similarity scores comprises determining similarity scores that are each indicative of a degree of similarity between the first context and the respective second contexts.

6. The computer-implemented method of claim 1, wherein:
   obtaining the first profile data for the first user comprises obtaining current profile data for the first user; and
   obtaining the second profile data for the second comprises obtaining profile data corresponding to times when the search queries were submitted.

7. The computer-implemented method of claim 1, wherein:
   obtaining the first profile data for the first user comprises obtaining information indicating a first geographical location;
   obtaining the second profile data for the second users comprises obtaining information that indicates second geographical locations from which the respective search queries were submitted; and
   determining the similarity scores comprises determining the similarity scores based on distances between the first geographical location and the respective second geographical locations.

8. The computer-implemented method of claim 7, wherein obtaining information indicating the first geographical location comprises receiving information indicating a current location of the computing device.

9. The computer-implemented method of claim 1, wherein:
   obtaining the first profile data for the first user comprises obtaining information that indicates a user type for the first user;
   obtaining the second profile data for the second users comprises obtaining information that indicates user types for the second users; and
   determining the similarity scores comprises:
      determining whether the user type for first user matches the user types for the respective second users; and determining the similarity scores based on whether the user type for the first user matches the user type for the respective second users.

10. The computer-implemented method of claim 1, wherein:
obtaining the first profile data for the first user comprises obtaining first demographic information for first user;
obtaining the second profile data for the second users comprises obtaining second demographic information for the respective second users; and
determining the similarity scores comprises determining the similarity scores based on commonalities between the first demographic information and the second demographic information.

11. The computer-implemented method of claim 1, wherein:
obtaining the first profile data for the first user comprises obtaining a first search query history for the first user;
obtaining the second profile data for the second users comprises obtaining second search query histories for the second users; and
determining the similarity scores comprises determining the similarity scores based on commonalities between the first search query history and the respective second search query histories.

12. A system comprising:
one or more computers and one or more storage devices storing instructions that are operable, when executed by the one or more computers, to cause the one or more computers to perform operations comprising:
obtaining first profile data for a first user that is associated with a computing device;
obtaining second profile data for second users that submitted search queries, the second users being different from the first user;
determining, based on the first profile data and the second profile data, similarity scores that are each indicative of a degree of similarity between the first user and at least one of the second users;
selecting a proper subset of the search queries based on the similarity scores;
generating an update for an autocomplete cache of the computing device associated with the first user using the selected subset of the search queries; and
providing the update to the computing device associated with the first user.

13. The system of claim 12, wherein selecting the proper subset of the search queries based on the similarity scores comprises selecting a particular search query based on one of the similarity scores that is indicative of a degree of similarity between the first user and one of the second users that submitted the particular search query.

14. The system of claim 12, wherein selecting the proper subset of the search queries based on the similarity scores comprises:
determining whether each of the similarity scores exceeds a threshold similarity score; and
selecting the search queries for which it is determined that the similarity score that is indicative of a degree of similarity between the first user and the second user that submitted the search query exceeds the threshold similarity score.

15. The system of claim 12, wherein selecting the proper subset of the search queries based on the similarity scores comprises:
selecting a proper subset of the second users, the subset of the second users comprising second users for which a corresponding similarity score exceeds a threshold similarity score; and
selecting the search queries submitted by the second users in the proper subset of the second users as the subset of the search queries.

16. The system of claim 12, wherein:
obtaining the first profile data for the first user comprises obtaining information that indicates a first context of the computing device;
obtaining the second profile data for the second users comprises obtaining information that indicates second contexts in which the respective search queries were submitted; and
determining the similarity scores comprises determining similarity scores that are each indicative of a degree of similarity between the first context and the respective second contexts.

17. The system of claim 12, wherein:
obtaining the first profile data for the first user comprises obtaining current profile data for the first user; and
obtaining the second profile data for the second users comprises obtaining profile data corresponding to times when the search queries were submitted.

18. The system of claim 12, wherein:
obtaining the first profile data for the first user comprises obtaining information indicating a first geographical location;
obtaining the second profile data for the second users comprises obtaining information that indicates second geographical locations from which the respective search queries were submitted; and
determining the similarity scores comprises determining the similarity scores based on distances between the first geographical location and the respective second geographical locations.

19. The system of claim 18, wherein obtaining information indicating the first geographical location comprises receiving information indicating a current location of the computing device.

20. The system of claim 12, wherein:
obtaining the first profile data for the first user comprises obtaining information that indicates a user type for the first user;
obtaining the second profile data for the second users comprises obtaining information that indicates user types for the second users; and
determining the similarity scores comprises:
determining whether the user type for first user matches the user types for the respective second users; and
determining the similarity scores based on whether the user type for the first user matches the user type for the respective second users.

21. The system of claim 12, wherein:
obtaining the first profile data for the first user comprises obtaining first demographic information for first user;
obtaining the second profile data for the second users comprises obtaining second demographic information for the respective second users; and
determining the similarity scores comprises determining the similarity scores based on commonalities between the first demographic information and the second demographic information.

22. The system of claim 12, wherein:
obtaining the first profile data for the first user comprises obtaining a first search query history for the first user;

obtaining the second profile data for the second users comprises obtaining second search query histories for the second users; and determining the similarity scores comprises determining the similarity scores based on commonalities between the first search query history and the respective second search query histories.

23. A computer storage medium encoded with a computer program, the program comprising instructions that when executed by one or more computers cause the one or more computers to perform operations comprising:

obtaining first profile data for a first user that is associated with a computing device;

obtaining second profile data for second users that submitted search queries, the second users being different from the first user;

determining, based on the first profile data and the second profile data, similarity scores that are each indicative of a degree of similarity between the first user and at least one of the second users;

selecting a proper subset of the search queries based on the similarity scores;

generating an update for an autocomplete cache of the computing device associated with the first user using the selected subset of the search queries; and providing the update to the computing device associated with the first user.

24. The computer storage medium of claim 23, wherein selecting the proper subset of the search queries based on the similarity scores comprises selecting a particular search query based on one of the similarity scores that is indicative of a degree of similarity between the first user and one of the second users that submitted the particular search query.

25. The computer storage medium of claim 23, wherein selecting the proper subset of the search queries based on the similarity scores comprises:

determining whether each of the similarity scores exceeds a threshold similarity score; and selecting the search queries for which it is determined that the similarity score that is indicative of a degree of similarity between the first user and the second user that submitted the search query exceeds the threshold similarity score.

26. The computer storage medium of claim 23, wherein selecting the proper subset of the search queries based on the similarity scores comprises:

selecting a proper subset of the second users, the subset of the second users comprising second users for which a corresponding similarity score exceeds a threshold similarity score; and selecting the search queries submitted by the second users in the proper subset of the second users as the subset of the search queries.

27. The computer storage medium of claim 23, wherein:

obtaining the first profile data for the first user comprises obtaining information that indicates a first context of the computing device;

obtaining the second profile data for the second users comprises obtaining information that indicates second contexts in which the respective search queries were submitted; and determining the similarity scores comprises determining similarity scores that are each indicative of a degree of similarity between the first context and the respective second contexts.

28. The computer storage medium of claim 23, wherein:

obtaining the first profile data for the first user comprises obtaining current profile data for the first user; and obtaining second profile data for the second users comprises obtaining profile data corresponding to times when the search queries were submitted.

29. The computer storage medium of claim 23, wherein:

obtaining the first profile data for the first user comprises obtaining information indicating a first geographical location;

obtaining the second profile data for the second users comprises obtaining information that indicates second geographical locations from which the respective search queries were submitted; and determining the similarity scores comprises determining the similarity scores based on distances between the first geographical location and the respective second geographical locations.

30. The computer storage medium of claim 29, wherein obtaining information indicating the first geographical location comprises receiving information indicating a current location of the computing device.

31. The computer storage medium of claim 23, wherein:

obtaining the first profile data for the first user comprises obtaining information that indicates a user type for the first user;

obtaining the second profile data for the second users comprises obtaining information that indicates user types for the second users; and determining the similarity scores comprises:
    determining whether the user type for first user matches the user types for the respective second users; and
    determining the similarity scores based on whether the user type for the first user matches the user type for the respective second users.

32. The computer storage medium of claim 23, wherein:

obtaining the first profile data for the first user comprises obtaining first demographic information for first user;

obtaining the second profile data for the second users comprises obtaining second demographic information for the respective second users; and determining the similarity scores comprises determining the similarity scores based on commonalities between the first demographic information and the second demographic information.

33. The computer storage medium of claim 23, wherein:

obtaining the first profile data for the first user comprises obtaining a first search query history for the first user;

obtaining the second profile data for the second users comprises obtaining second search query histories for the second users; and determining the similarity scores comprises determining the similarity scores based on commonalities between the first search query history and the respective second search query histories.

* * * * *